United States Patent [19]

Davidian

[11] Patent Number: 4,827,581

[45] Date of Patent: May 9, 1989

[54] METAL CASKET CONTAINING A PLASTISOL LINER AND METHOD OF MAKING THE SAME

[76] Inventor: Michael Davidian, 34 Regent Dr., Oak Brook, Ill. 60521

[21] Appl. No.: 144,951

[22] Filed: Jan. 19, 1988

[51] Int. Cl.$^4$ ............................................. A61G 17/00
[52] U.S. Cl. ............................................. 27/3; 27/19
[58] Field of Search ........................ 27/2, 3, 5, 11, 19, 27/35; 428/36, 413; 427/239, 327

[56] References Cited

U.S. PATENT DOCUMENTS

| | | | |
|---|---|---|---|
| 194,530 | 8/1877 | Nirdlinger | 27/19 |
| 2,375,386 | 5/1945 | Rick | 27/35 |
| 2,544,168 | 3/1951 | Lusby | 27/19 |
| 3,353,238 | 11/1967 | Sieloff | 27/19 |
| 3,407,459 | 10/1968 | Elder | 27/19 |
| 3,487,513 | 1/1970 | Herring et al. | 27/19 |
| 3,831,230 | 8/1974 | Rawlings | 27/19 |
| 4,137,613 | 2/1979 | Ceresko | 27/19 |
| 4,387,491 | 6/1983 | Schaaf et al. | 27/35 |
| 4,448,826 | 5/1984 | Davidian | 27/3 |
| 4,727,632 | 3/1988 | Yearsley | 27/35 |

FOREIGN PATENT DOCUMENTS

| | | | |
|---|---|---|---|
| 183974 | 10/1876 | U.S.S.R. | 27/19 |
| 3283386 | 11/1966 | U.S.S.R. | 27/3 |
| 3967045 | 6/1976 | U.S.S.R. | 427/327 |
| 908682 | 10/1962 | United Kingdom | 27/19 |

Primary Examiner—Mickey Yu
Assistant Examiner—Michael Brown
Attorney, Agent, or Firm—Andrus, Sceales, Starke & Sawall

[57] ABSTRACT

A metal casket having an impervious plastisol liner and method of producing the casket. A plastisol coating composition is prepared of a thermoplastic resin, a plasticizer for the resin, and a small amount of adhesion resin which is capable of bonding to the casket surface. The coating composition is applied to the inner surface of the casket and the casket is heated to a temperature above 225° F. to provide a fused impervious coating. The coating is resistant to the organic acids contained within the casket and acts as a containment liner to seal and prevent corrosion of the casket.

6 Claims, No Drawings

METAL CASKET CONTAINING A PLASTISOL LINER AND METHOD OF MAKING THE SAME

BACKGROUND OF THE INVENTION

Recently, an increased proportion of caskets are contained within crypts in above-ground mausoleums. It has been found that the metal casket is prone to deterioration through corrosion by organic acids contained within the casket as well as by oxidative corrosion. The oxidation of formaldehyde used in the embalming fluid generates formic acid, and the decomposition of the human remains also generates other organic acids which will attack and corrode the metal casket, resulting in the destruction of the casket and leakage of the acidic components. The leakage of the acid from the casket can stain, discolor and damage the marble crypts.

As an additional problem, the putrification of the human remaains in the casket due to microbial growth can cause undesirable odors in the crypt and mausoleum.

Attempts have been made in the past to prevent the corrosion of metal caskets by the application of various types of coatings such as asphalt, amine salts, polyurethane form and the like. However, coatings of this type have not been satisfactory in combating acidic corrosion caused by the organic acids.

U.S. Pat. No. 4,520,043 is directed to an improved coating composition for a metal casket in which the coating comprises a resin or rubber matrix containing finely divided dispersed particles of an alkaline material, such as a metal carbonate or bicarbonate. The ingredients of the coating composition are mixed with an evaporable carrier, such as water, and applied to the interior surface of the casket. On evaporation of the carrier, a thin moisture-permeable coating results. As the organic acids permeate through the coating, the acids will be neutralized by the alkaline material contained within the coating to thereby prevent acidic corrosion of the metal casket.

SUMMARY OF THE INVENTION

The invention is directed to an impervious plastisol coating for the internal surface of a metal casket which will seal imperfections in the casket as well as acting as a containment liner to prevent corrosion of the casket.

The coating is composed of a thermoplastic resin, such as polyvinylchloride or polyvinylidene chloride or polymers thereof, a plasticizer for the thermoplastic resin, and a small amount of an adhesion resin which preferably takes the form of a thermosetting resin. The liquid coating composition is applied to the inner surface of the casket by spraying, brushing, etc. A casket is normally subjected to a paint baking cycle in which the casket is heated to a temperature above 225° F. During this heating cycle, the thermoplastic resin and the plasticizer will solubilize and on cooling, a flexible impervious coating is provided which is firmly bonded to the casket by the adhesion resin.

The resulting coating effectively seals all seams and pinholes in the casket and is resistant to attack by organic acids contained within the casket.

The coating is applied in situ and takes advantage of the normal paint baking operation so that no additional energy requirements are necessary to provide the fused coating.

As the liquid coating composition contains minimal volatiles, any potential problems caused by evaporation of volatiles are eliminated.

The resulting coating is relatively flexible or rubbery in nature, and will bend or flex in the event the casket may be subjected to impact so that the coating will not fracture or break.

Due to the incorporation of the adhesion resin, the coating is firmly bonded to the inner surface of the casket throughout its surface area.

Other objects and advantages will appear in the course of the following description.

DESCRIPTION OF THE PREFERRED EMBODIMENT

In accordance with the invention, an impervious, plastisol coating is applied to the inner surface of the casket which seals the casket and provides a containment liner to prevent corrosion of the metal casket by the contained organic acids.

The casket itself is a conventional type, normally formed of steel or copper, and, as such, can be sujected in use to both acidic and oxidative corrosion. The oxidation of formaldehyde used in the embalming fluid will generate formic acid, and the decomposition of the human remains can also generate other organic acids.

In general, the coating composition consists of from 30% to 80% by weight of a thermoplastic resin, from 18% to 70% by weight of a plasticizer for the thermoplastic resin, and from 2% to 50% of an adhesive resin.

The thermoplastic resin can take the form of polyvinyl chloride, polyvinyl chloride copolymers, polyvinyl chloride terpolymers, polyvinylidene, polyvinylidene chloride copolymers, polyvinylidene terpolymers, polyvinyl acetate and copolymers thereof.

The plasticizer is a material which is compatible with the thermoplastic resin. Examples of plasticizers that can be used are phthalate esters such as di-2-ethyl-hexylphthalate; DOP alcoholphthalate esters, such as dihexyl phthalate; phosphate esters, such as tricresyl phosphate; long chain aliphatic alcohol esters of straight chain or aliphatic dibasic acids, such as dioctyl adipate; monomeric esters such as triisooctyl trimellitate; chlorinated hydrocarbons such as chlorinated paraffin; aliphatic hydrocarbons such as paraffinic oils; and aromatic hydrocarbons, such as aromatic and naphthenic oils.

The adhesion resin can take the form of a thermosetting resin, such as one and two stage phenolic resins; liquid or solid epoxy resins with latent curing agents, such as blocked amines; dicyandiamide; and the like. The thermosetting resin system should be of a type that has a delayed cure so that the resin will not fully cure until after the composition is mixed and applied to the surface.

It is also contemplated that the adhesion resin can take the form of a thermoplastic resin, such as an acrylic resin or a hydrocarbon resin.

In addition, antioxidant materials in the amount of 0.1% to 20% by weight can be incorporated in the composition. The antioxidants can take the form of any conventional reducing agents which would be compatible with the composition, such as alkaline metal nitrites, exemplified by sodium or potassium nitrite, or metal oxides, such as zinc oxide, calcium oxide, magnesium oxide, sodium oxide, or the like.

To inhibit microorganism growth in the casket, a bacteriacide, such as 2-n-octyl-4-isothiazoline-3-1 benzyl bromaoacetate or the like, can be included in the amount of 0.1% to 0.5% of the weight of the coating composition.

The coating composition can also contain small amounts of other ingredients. For example, wetting agents such as polyethylene glycol 200 monolaurate can be incorporated in an amount up to 5% of the formulation to aid in wetting. Further, coloring materials, such as carbon black, titanium dioxide and the like can be included in an amount up to 5% by weight of the composition to provide the desired color for the coating composition.

Stabilization to heat and chemical breakdown of the vinyl polymer can be accomplished by the addition of stablizers, such as barium-zinc complexes or epoxidized soybean oil, in amounts of 1% to 5% of the coating composition.

The ingredients of the composition are mixed together at room temperature to provide a liquid composition or slurry and the liquid is then applied to the inner surface of the casket by spraying, brushing, dipping, rolling or the like to provide a coating having a thickness of about 1 to 30 mils.

To provide the desired viscosity for the liquid composition to be applied to the casket surface, a small amount, up to 15% by weight, of a diluent, such as mineral spirits, can be added to the composition.

The casket normally goes through a paint-bake operation at a temperature above 225° F., and normally about 300° F., to bake the paint on the exterior casket surfaces. At this temperature, the plastisol coating composition will fuse and on cooling to room temperature, an impervious, adherent, flexible coating is provided. Depending on the type of adhesion resin and plasticizer that is employed, the adhesion resin may be solubilized in the coating, or alternatively may exist as discrete particles within the coating. The solidified coating is relatively flexible or rubbery in nature, and yet adheres tightly to the casket surface due to the adhesion resin.

The following examples illustrate the formulation on the coating of the invention.

Example 1

The following composition was prepared by mixing the ingredients in parts by weight at room temperature.

| | |
|---|---|
| Polyvinylchloride (Geon 121, B. F. Goodrich Chemical Co.) | 100 |
| di-2-ethyl hexyl phthalate | 65 |
| Epoxidized soybean oil (stabilizer) | 10 |
| Two stage phenolic resin | 15 |
| Polyethylene glycol di-(2-ethyl hexoate) | 10 |

The composition was applied by spraying to the interior surface of a steel casket to provide a coating having a thickness of 2 mils. The casket was then heated to a temperature of 350° F. and held at this temperature for 15 minutes. After heating, the casket was cooled to room temperature to provide an impervious adherent coating on the inner surface of the casket.

Example 2

The following formulation was prepared in parts by weight:

| | |
|---|---|
| Polyvinylchloride (753 × 10, Ethyl Corp.) | 100 |
| Dioctyl adipate | 50 |
| Barium Zinc complex | 2 |
| Mineral spirits | 10 |
| Epoxy resin | 15 |
| Latent amide curing agent | 10 |

The liquid composition was applied by brushing to the inner surface of a steel casket to provide a coating having a thickness of 3 mils.

The casket was subsequently heated to a temperature of 350° F. and held at this temperature for 15 minutes. On cooling to room temperature, an adherent impervious coating was produced on the inner surface of the casket.

The coating of the invention effectively seals all defects, such as pinholes and seams, in the casket, and as it is resistant to attack by organic acids containing within the casket, it will provide a containment liner to prevent corrosion of the metal casket.

The application of the coating takes advantage of the normal paint baking cycle for the casket so that no additional energy requirements are necessary to provide the coating.

As the coating can be prepared without the use of solvents or water, minimal volatile emissions are given off during the heating cycle, which eliminates any potential air pollution problems.

As the resulting coating is relatively flexible or rubbery in nature, it will not break or fracture in the events the casket is subjected to impact during shipment or handling.

Various modes of carrying out the invention are contemplated as being within the scope of the following claims particularly pointing out and distinctly claiming the subject matter which is regarded as the invention.

I claim:

1. A method of fabricating a casket, comprising the steps of admixing 35% to 80% by weight of a thermoplastic resin, 18% to 70% by weight of a plasticizer, and 2% to 20% by weight of an adhesion resin to form a liquid composition, applying said liquid composition to the inner surface of said metal casket to form a coating thereon, and heating the casket to a temperature above 225° F. for a sufficient period of time to provide an adherent flexible impervious coating on said casket, said coating providing a containment liner to prevent corrosion of said metal casket by corrosive fluids contained within the casket in service.

2. The method of claim 1, wherein the step of heating the casket comprises heating to a temperature of about 300° F.

3. The method of claim 1, said thermoplastic resin is selected from the group consisting of polyvinyl chloride, polyvinyl chloride copolymers, polyvinyl chloride terpolymers, polyvinylidene chloride, polyvinylidene chloride copolymers, polyvinylidene chloride terpolymers, polyvinyl acetate and polyvinyl acetate copolymers, said adhesion resin being selected from the group consisting of one and two stage phenolic resins and epoxy resins with latent curing agents.

4. The method of claim 1, wherein the step of applying said liquid compositon to the inner surface of said metal casket is carried out without the addition of an evaporable carrier.

5. A casket construction, comprising a metal casket, and a flexible impervious adherent coating bonded to the inner surface of said casket, said coating composed of a homogeneous plasticized thermoplastic resin matrix and containing an adhesion resin bonded to said metal casket, said coating being an impervious containment liner to prevent contact of said metal casket by corrosive fluids contained within said casket.

6. The construction of claim 5, wherein said thermoplastic resin is selected from the group consisting of polyvinyl chloride, polyvinyl chloride copolymers, polyvinyl chloride terpolymers, polyvinylidene chloride, polyvinylidene chloride copolymers, polyvinylidene chloride terpolymers, polyvinyl acetate and polyvinyl acetate copolymers, said adhesion resin being selected from the group consisting of one and two stage phenolic resins and epoxy resins with latent curing agents.

* * * * *

REEXAMINATION CERTIFICATE (2167th)

United States Patent [19]

Davidian

[11] B1 4,827,581

[45] Certificate Issued Dec. 28, 1993

[54] METAL CASKET CONTAINING A PLASTISOL LINER AND METHOD OF MAKING THE SAME

[75] Inventor: Michael Davidian, Oak Brook, Ill.

[73] Assignee: American Industrial Technologies, Inc., Addison, Ill.

Reexamination Requests:
No. 90/002,725, May 18, 1992
No. 90/002,858, Oct. 15, 1992

Reexamination Certificate for:
Patent No.: 4,827,581
Issued: May 9, 1989
Appl. No.: 144,951
Filed: Jan. 19, 1988

[51] Int. Cl.$^5$ .............................................. A61G 17/00
[52] U.S. Cl. .............................................. 27/3; 27/19
[58] Field of Search ................... 27/2, 3, 5, 11, 19, 27/35; 427/327, 239

[56] References Cited

U.S. PATENT DOCUMENTS

| | | | |
|---|---|---|---|
| 3,539,480 | 11/1970 | Groff et al. | 260/23 |
| 3,696,183 | 10/1972 | Steele et al. | |
| 4,146,520 | 3/1979 | Bierwirth et al. | |
| 4,151,317 | 4/1979 | Burba et al. | |
| 4,210,567 | 7/1980 | Kosters | |
| 4,444,837 | 4/1984 | Blum et al. | |
| 4,448,826 | 5/1984 | Davidian | |
| 4,520,043 | 5/1985 | Davidian | 427/239 |
| 4,533,524 | 8/1985 | Burba et al. | |

OTHER PUBLICATIONS

"Polyvinyl Cloride", Harold A. Sarvetnick, pp. 206–208, 1969, New York.
Plastics Engineering Handbook of the Society of the Plastic Industry Inc., 4th Ed., Joel Frados, (ed), pp. 365–380, 1976, New York.
I. Skeist, "Handbook of Adhesives", 2nd Ed., Livingston, 1977; Van Nostrand Reinhold Company, p. 27.
M. Gutcho, "Adhesives Technology Developments Since 1979", Park Ridge, New Jersey, 1983 Noyes Data Corp. pp. 346–358.
Brochure, Bastesville Casket Company Inc., 1983, "Chemgard".

*Primary Examiner*—Carl Friedman

[57] ABSTRACT

A metal casket having an impervious plastisol liner and method of producing the casket. A plastisol coating composition is prepared of a thermoplastic resin, a plasticizer for the resin, and a small amount of adhesion resin which is capable of bonding to the casket surface. The coating composition is applied to the inner surface of the casket and the casket is heated to a temperature above 225° F. to provide a fused impervious coating. The coating is resistant to the organic acids contained within the casket and acts as a containment liner to seal and prevent corrosion of the casket.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7 and 8 are added and determined to be patentable.

*7. A method of fabricating a casket, comprising the steps of admixing from 35% to 80% by weight of a thermoplastic, resin, 18% to 70% by weight of a plasticizer, and 2% to 20% by weight of an adhesion resin to form a liquid composition, applying said liquid composition to the inner surface of a metal casket to form a coating thereon, applying a coating of paint to the outer surface of the casket, heating the casket to a temperature above 225° F. for a sufficient period of time to bake the paint coating and to fuse said composition and provide a flexible impervious coating on the inner surface of said casket, said impervious coating providing a containment liner to prevent corrosion of said metal casket by corrosive fluids contained within the casket in service.*

*8. The method of claim 7, and including the step of maintaining the composition substantially free of evaporable carriers.*

* * * * *